3,246,682
FUEL CONTROL FOR COMBUSTION ENGINES
Howard L. McCombs, Jr., South Bend, Ind., assignor to The Bendix Corporation, South Bend, Ind., a corporation of Delaware
Original application Mar. 30, 1961, Ser. No. 99,411, now Patent No. 3,173,468, dated Mar. 16, 1965. Divided and this application Aug. 20, 1964, Ser. No. 390,825
4 Claims. (Cl. 158—36.4)

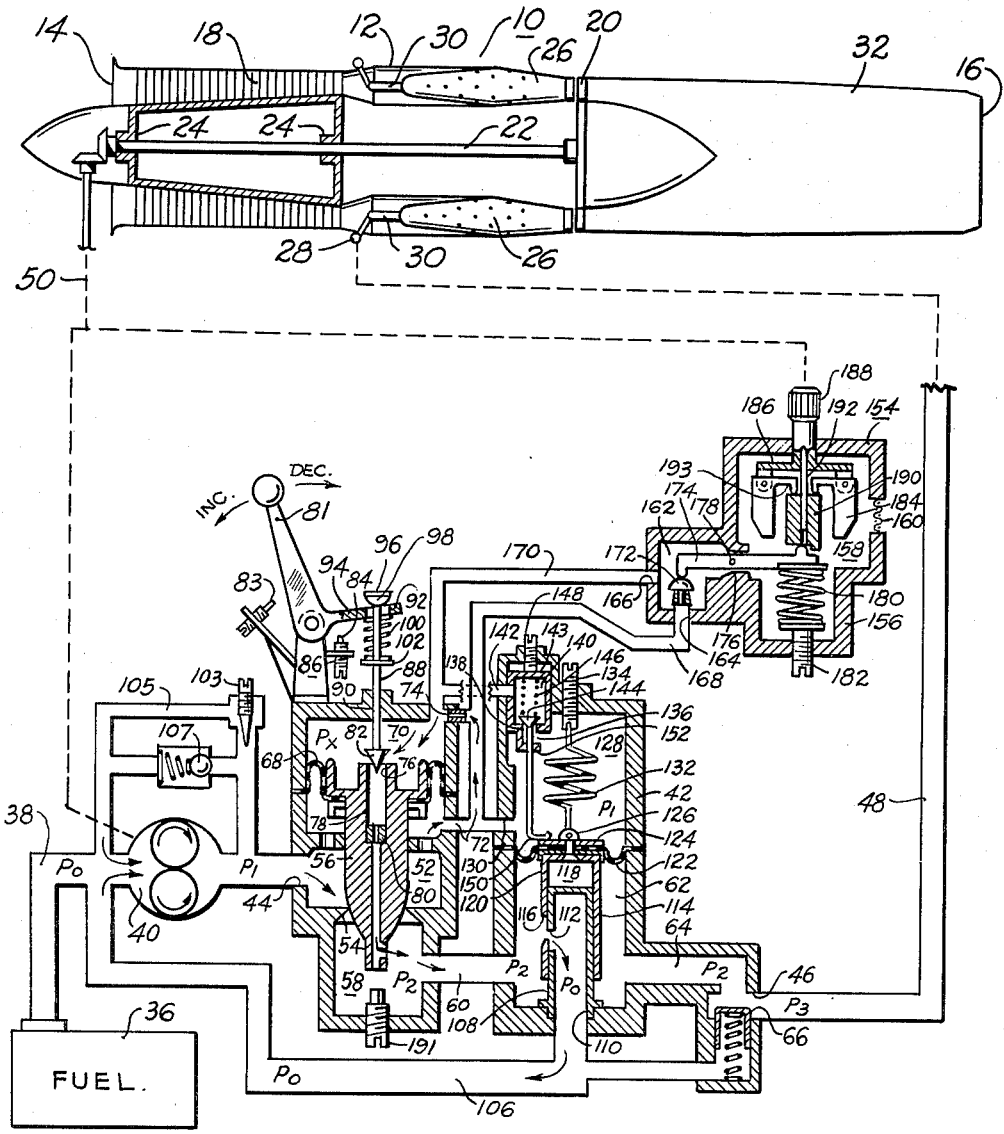

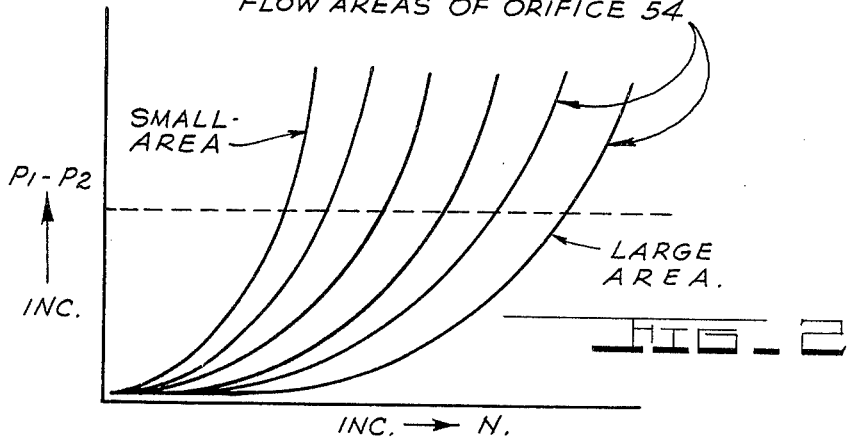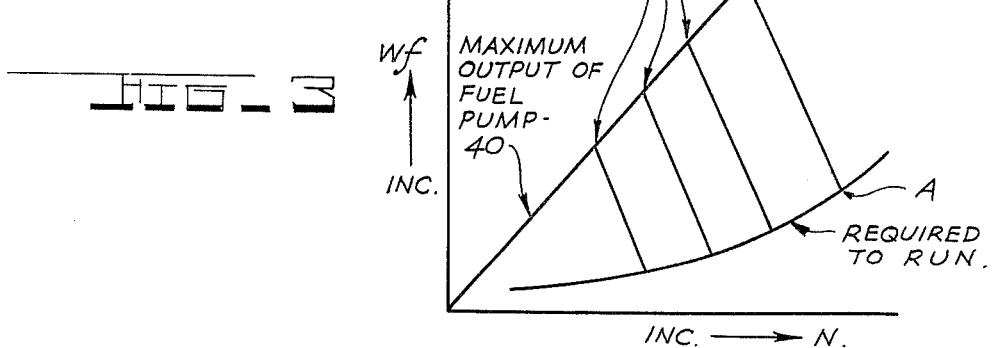
INVENTOR.
HOWARD L. McCOMBS, JR.
BY
Howard H. Cheney
AGENT.

This application is a division of my copending application Serial No. 99,411, filed March 30, 1961 entitled Fuel Control for Combustion Engines, now Patent No. 3,173,-468, issued March 16, 1965. This invention relates, in general, to fuel control apparatus for combustion engines and, in particular, to a fuel control for a gas turbine engine.

It is an object of this invention to provide fuel control apparatus for a combustion engine which regulates fuel flow accurately and reliably over the operating regime of the engine.

It is another object of this invention to provide fuel control apparatus for a combustion engine which regulates fuel flow as a predetermined function of time during an acceleration of the engine.

It is an important object of this invention to provide a fuel control for a gas turbine engine wherein the velocity in an opening direction of a fuel control valve is limited to a predetermined value to thereby limit the rate of change of fuel flow to the engine and thus maintain engine acceleration within predetermined limits.

It is a further object of the present invention to provide fuel control apparatus for a combustion engine wherein governor mechanism operates to control fuel flow during both steady state and acceleration operating conditions.

An important object of the present invention is to provide fuel control apparatus for a combustion engine which regulates fuel flow to the engine to prevent excessive overfueling in the event that the engine fails to accelerate upon request.

It is still another object of the present invention to provide fuel control apparatus for a combustion engine which provides an acceleration fuel flow schedule of such proportion that the engine is unable to accelerate in excess of a predetermined maximum value.

Other objects and advantages of the present invention will become apparent from the following description taken in conjunction with the drawings wherein:

FIGURE 1 represents a sectional view in schematic form of a gas turbine engine having operatively associated therewith a fuel control embodying the present invention;

FIGURE 2 represents a series of curves having a $P_1$–$P_2$ pressure differential vs. N speed relationship for various control valve areas;

FIGURE 3 represents a series of curves having a $W_f$, fuel flow, vs. N speed, for various control valve areas and the effect of the governor valve during governor break operation; and FIGURE 4 represents curves showing the relationship between speed and time as modified by the contour of the control valve.

Referring to the drawings, FIGURE 1 discloses a gas turbine engine generally indicated by numeral 10 and provided with a casing 12 having an air inlet 14 and air outlet 16. Air taken in through inlet 14 is pressurized by a compressor 18 driven by a turbine 20 via a shaft 22 journaled in bearings 24. Fuel supplied to combustion chambers 26 via fuel manifold 28 and fuel nozzles 30 is mixed with the pressurized air and burned to thereby provide hot motive gas for driving the turbine. Energy in excess of that required to drive the turbine may be extracted from the hot motive gas flowing through outlet 16 by providing a conveying diverging thrust producing nozzle 32 in the case of jet propelled aircraft. Alternatively, the excess energy may be extracted by an energy take-off turbine, not shown, suitably mounted in series with and downstream from the turbine 20 in which case the converging diverging thrust producing nozzle 32 would be eliminated. The torque derived from the energy take-off turbine may be utilized to drive the rotary wing of helicopters in the case of aircraft or, electrical generators (in the case of stationary gas turbine engine operation) or road vehicles, and the like as will be readily understood by those persons skilled in the appropriate art. Another possible use of such a gas turbine engine is to produce hot motive gas for use in steam generating plants wherein energy in excess of that required to drive the turbine 20 is extracted from the hot exhaust gas by heating water in which case both the energy take-off turbine and the thrust producing nozzle 32 would be eliminated.

Metered fuel is supplied to the fuel manifold 28 via fuel tank 36, fuel conduit 38, an engine driven positive displacement fuel pump 40, a casing 42 having inlet and outlet ports 44 and 46, respectively, and a fuel conduit 48. The fuel pump 40 is driven by the turbine 20 via a suitable conventional shafting and gearing arrangement generally indicated by numeral 50. Inside the casing 42, fuel flows from inlet port 44 to outlet port 46 via a chamber 52, a variable area orifice 54 controlled by a fuel control valve 56, a chamber 58, a conduit 60, a chamber 62, a conduit 64 and a spring loaded pressurizing valve generally indicated by 66. A pressure differential responsive diaphragm 68 suitably attached at its inner and outer peripheral edges to valve 56 and casing 42, respectively, separates chamber 52 at fuel pressure $P_1$ from a chamber 70 at fuel pressure $P_x$ and positions control valve 56 relative to orifice 54 in response to the fuel pressure differential $P_1$–$P_x$ hereinafter referred to as a control fuel pressure differential. The chamber 70 receives fuel from chamber 52 at pressure $P_1$ via passage 72 in which a restriction 74 is suitably disposed and discharges fuel to chamber 58 at pressure $P_2$ via a variable area orifice 76 and passage 78 centrally located in valve 56. A restriction 80 suitably disposed in passage 78 serves to control the response characteristics of valve 56. The fuel pressure $P_x$ is modulated as a function of the position of a manually operated control lever 81 which controls the position of a valve 82 and which is limited to a predetermined range of movement by adjustable maximum and minimum stops 83 and 84, respectively, suitably fixedly mounted on a support member 86 upon which the control lever 81 is pivotally mounted. The valve 82 cooperates with the orifice 76 to vary the effective flow area thereof and is positioned relative thereto by a valve stem 88 which extends through an opening 90 in casing 42 and opening 92 in a lever arm 94 integral with control lever 81. The valve stem 88 is fixedly secured at one end to the valve 82 and at the opposite end is pivotally connected to lever arm 94 via extension 96 having a spherical portion 98. A spring 100 interposed between the lever arm 94 and an annular shoulder 102 formed on valve stem 88 serves to bias the lever arm 94 against the spherical portion 98. Fuel flow on the discharge side of fuel pump 40 may be trimmed for calibration purposes by suitable adjustment of an adjustable valve 103 secured in passage 105 connected between inlet and discharge sides of fuel pump 40. Relief valve 107 in parallel with valve 103 serves to limit the pump discharge pressure $P_1$ to a maximum allowable value.

The pressure differential $P_1-P_2$ across variable area orifice 54 is used to control a bypass valve which also operates as a governor valve and which is suitably arranged in chamber 62 to control the fuel flow through a fuel bypass conduit 106 connected between chamber 62 and conduit 38 at fuel pump inlet presusre $P_0$. The bypass valve includes a cylinder 108 closed at one end and fixedly secured to casing 42 at its opposite open end 110. The cylinder 108 is provided with a port 112, the effective area of which is controlled by a sleeve 114 slidably mounted on cylinder 108 and provided with a port 116 which, together with port 112 forms a variable area flow orifice. A chamber 118 defined by sleeve 114 including the closed end thereof and the closed end of cylinder 108 communicates with chamber 62 at fuel pressure $P_2$ via a port 120 formed in sleeve 114. A flexible diaphragm 122 fixedly secured to the closed end of sleeve 114 by means of a backing plate 124 and associated fastening member 126 separates chamber 62 from a chamber 128 and is responsive to the fuel pressure differential $P_1-P_2$ therebetween. Chamber 128 communicates with passage 72 at fuel pressure $P_1$ via passage 130. The fuel pressure differential $P_1-P_2$ at which diaphragm 122 stabilizes positionally is determined by the predetermined force exerted by spring 132 connected at one end to the fastening member 126 and at the opposite end to an adjustable spring retainer 134 threadedly engaged with casing 42.

Under certain conditions of operation to be described hereinafter, fuel is introduced to chamber 70 from chamber 128 via a passage 136, an orifice 138, a chamber 140 and a passage 142. The passage 136, orifice 138 and chamber 140 are defined by an adjustable tubular member 143 slidably carried by casing 42. A poppet valve 144 is seated against orifice 138 by a spring 146 interposed between the poppet valve and the tubular member 143, the latter being adjustable by means of screw 148 suitably connected thereto and threadedly engaged with casing 42. The poppet valve 144 is provided with an integral stem 150 which extends through an opening 152 in tubular member 143 into engagement with backing plate 124.

A topping governor 154 may be installed, if desired, to provide additional protection against overspeeding of turbine 20 and/or energy take-off turbine. FIGURE 1 shows the topping governor 154 operatively connected to and driven by the shafting and gearing arrangement 50 in which case overspeed protection is provided for the turbine 20, only. However, overspeed protection for the energy take-off turbine may be provided by connecting the topping governor 154 to the energy take-off turbine instead of the turbine 20 in which case the driving connection to the governor 154 must be modified acccordingly. The topping governor 154 includes a casing 156 having a chamber 158 suitably vented to the atmosphere via a port 160 and a chamber 162 provided with inlet and outlet ports, 164 and 166, respectively. A passage 168 communicates inlet port 164 with passage 72 upstream from restriction 74 and a passage 170 communicates outlet port 166 with passage 72 downstream from restriction 74. A normally closed flapper valve 172 connected to inlet port 164 is engaged by one end of a lever 174 which extends through an opening 176 in casing 156 and which is pivotally mounted on pin 178 fixedly secured to casing 156. The opposite end of lever 174 extends into chamber 158 and is loaded in a counterclockwise direction by a spring 180 interposed between said opposite end of lever 174 and an adjustable spring retaining member 182 threadedly engaged with casing 156. At a predetermined speed of turbine 20 the force of spring 180 is overcome by the force output of a pair of centrifugal speed weights 184 suitably pivotally mounted on a rotatably actuated support member 186 having a splined extension 188 rotatably mounted in casing 156 and driven as a function of the speed of turbine 20 via gearing and shafting arrangement 50. An annular bearing member 190 slidably carried on a rod 192 fixedly secured to support member 186 is interposed between the end of lever 174 and arms 193 integral with speed weights 184.

*Operation of FIGURE 1*

It will be assumed that engine operation is stable at a speed corresponding to the set position of the control lever 81 in which case the various component control parts of the present invention will occupy the positions shown in FIGURE 1.

The fuel pump 40 supplies a fuel flow which is directly proportional to pump speed. The total fuel pump output is supplied to orifice 54 such that the fuel pressure differential $P_1-P_2$ thereacross varies as the square of fuel pump speed and thus the square of the speed of turbine 20 driving the fuel pump 40. For a given area of orifice 54, the fuel pump 40 must attain a certain speed to develop a given pressure differential $P_1-P_2$ across orifice 54. If the effective flow area of orifice 54 is decreased, the given pressure differential $P_1-P_2$ will be obtained at a lower speed of fuel pump 40 whereas an increase in the effective flow area of orifice 54 necessitates a correspondingly greater speed of fuel pump 40 in order to maintain the given fuel pressure differential $P_1-P_2$. The fuel pressure differential $P_1-P_2$ is dependent therefore upon the above-mentioned two principal factors of effective area of orifice 54 and/or the fuel flow output of fuel pump 40, the latter being a function of the speed of turbine 20. Referring to FIGURE 2 which illustrates the above-mentioned operation in terms of a plurality of curves which represent the fuel pressure differential $P_1-P_2$ vs. fuel pump speed N relationship for various flow areas of orifice 54, it will be noted that the speed of pump 40 must increase to maintain a given fuel pressure differential $P_1-P_2$ as the flow area of orifice 54 increases.

The fuel pressure differential $P_1-P_2$ across valve 56 is sensed by the diaphragm 122 attached to the governor valve which, in turn, opens at a predetermined fuel pressure differential $P_1-P_2$ depending upon the force exerted by spring 132 and vents fuel from chamber 62 downstream from the valve 56 to the passage 106 at fuel pump inlet pressure $P_0$ thereby reducing fuel flow to the combustion chambers 26. This operation of the governor valve and subsequent reduction in fuel flow is similar to the well-known "governor break" function encountered in conventional fuel control mechanism for combustion engines. It will be noted that the action of governor valve does not effect the fuel pressure differential $P_1-P_2$ across orifice 54 since such action does not cause a change in the fuel flow across orifice 54 or a change in the effective flow area of orifice 54. However, referring to FIGURE 3 which illustrates the linear relationship between the output fuel flow and speed of the fuel pump 40, it will be understood that the governor valve opens when the predetermined fuel pressure differential $P_1-P_2$ across orifice 54 is attained to thereby bypass fuel in excess of that required to maintain the turbine speed and thus fuel pump speed at the value required to establish the predetermined fuel pressure differential $P_1-P_2$ across orifice 54.

The spring 132 may be adjusted via spring retainer 134 to vary the spring load applied to the diaphragm 122 and thereby establish the predetermined pressure differential $P_1-P_2$ required to open governor valve. In this manner, any variations in the fuel pump 40 may be compensated for to thereby establish the proper relationship between the "governor break" and the speed setting established by the control lever 81.

Now, assuming that the control lever 81 is repositioned to request a higher than existing speed, it will be noted that valve 82 is urged upwardly away from orifice 76 thereby increasing the flow area of orifice 76 which, in turn, causes a reduction in fuel pressure $P_x$. The subsequent increase in fuel pressure differential $P_1-P_x$ across diaphragm 68 results in progressive upward movement of valve 56 and a corresponding progressive increase in the effective flow area of orifice 54. Since the rate of fuel flow to the conventional gas turbine engine during an acceleration of the same must be limited to predetermined values depending upon the maximum allowable engine operating temperatures and well-known characteristic compressor phenomena commonly known as "compressor surge," the movement of servo operated control valve 56 is restricted as a function of time and moves at a substantially constant velocity to thereby restrict the rate of change of area of orifice 54 which, in effect, results in a corresponding restriction on the rate of change of speed request. The velocity of control valve 56 is controlled in accordance with the effective area of diaphragm 68 and the relative sizes of restrictions 74, orifice 76 and restriction 80, as will be readily understood by those persons skilled in the art. It will be noted that the balance condition of control valve 56 depends upon satisfying a predetermined ratio relationship between fuel pressures $P_1$, $P_x$, and $P_2$ in accordance with the ratio of areas established by diaphragm 68 and attached valve 56 against which the fuel pressures $P_1$, $P_x$, and $P_2$ act. It will be understood that the balance condition of valve 56 does not depend upon the pressure level relationship but only the ratio of the pressures $P_1$, $P_x$, and $P_2$. Valve 56 will be in a state of movement whenever the predetermined ratio of pressures $P_1$, $P_x$, and $P_2$ is upset by variations in one or more of these fuel pressures. The fuel flow into and out of chamber 70 and thus fuel pressure $P_x$ depends upon the effective flow area of restriction 74 and orifice 76 as well as restriction 80, respectively, and the volumetric capacity of chamber 70 which depends upon the effective area of diaphragm 68 determines the pressure $P_x$ obtained for a given flow through the series restrictions 74, 76, and 80. Also fuel pressure $P_x$ varies as a function of the fuel pressure differential $P_1-P_2$ across orifice 54 by virtue of the parallel flow arrangement of chamber 70 and orifice 54.

As the engine accelerates, the fuel output of pump 40 being in excess of that required to accelerate the engine at the predetermined maximum value causes the pressure differential $P_1-P_2$ across orifice 54 to rise accordingly. The governor valve being spring loaded moves to an open position in response to a predetermined value of the fuel pressure differential $P_1-P_2$ across diaphragm 122 and vents sufficient fuel to passage 106 at fuel pressure $P_0$ to thereby reduce fuel flow to the combustion chamber and thus maintain the speed of turbine 20 upon which the speed of fuel pump 40 and thus fuel pressure $P_1$ depend closely related to the flow area of orifice 54. Since the velocity of movement of control valve 56 and thus the rate of increase in flow area of orifice 54 is a function of time, the turbine 20 speed and thus fuel pump 40 speed is controlled as a function of time accordingly. As the area of orifice 54 increases during an acceleration, the speed of fuel pump 40 increases correspondingly to thereby generate the predetermined fuel pressure differential $P_1-P_2$ across orifice 54 and, since the fuel output of pump 40 is in excess of that required to accelerate the turbine 20 at the rate corresponding to the rate of change of area of orifice 54, it will be recognized that the governor valve is operating at all times during an acceleration of the engine to maintain the speed of the turbine 20 and thus fuel pump 40 closely related to the area of orifice 54. FIGURE 3 shows a representative number of governor break curves for different areas of orifice 54. However, it will be understood that in actual operation during an acceleration, the governor break operation will occur for each incremental increase in area of orifice 54 over a relatively short period of time and will produce an overall acceleration fuel flow pattern which will accelerate the turbine 20 between any two speed points in a given time irrespective of other conditions of operation such as engine deterioration, engine characteristics as they differ from one engine to another, compressor inlet air density type of fuel, temperature of fuel and the like, all of which affect engine response characteristics. As the speed of turbine 20 approaches the value corresponding to the set position of control lever 81, the governor valve operates to reduce fuel flow to the value corresponding to the intersection of the governor break curve and the required-to-run curve (see point A, FIGURE 3) at which point the effective flow area of orifice 76 has decreased causing a rise in fuel pressure $P_x$ which, in turn, results in the aforementioned re-establishment of predetermined ratio of fuel pressures $P_1$, $P_x$ and $P_2$ across diaphragm 68 and valve 56 whereupon valve 56 is stabilized and the engine governed at point A accordingly.

The poppet valve 144 is normally closed and is adjusted to open and allow fuel at pressure $P_1$ to flow to chamber 70 at pressure $P_x$ when the governor valve is closed or nearly closed. A purpose of the poppet valve 144 is to prevent excessive overfueling of the engine in the event that the engine fails to accelerate when a speed increase is requested. As pointed out heretofore, an increase in the effective flow area of orifice 54 will cause a reduction in the fuel pressure differential $P_1-P_2$ thereacross unless the speed of fuel pump 40 and thus fuel pressure $P_1$ increases in accordance with the area increase or orifice 54. If the turbine 20 fails to accelerate, the speed of fuel pump 40 will not increase which, in turn, causes the fuel pressure differential $P_1-P_2$ across orifice 54 to decrease. The diaphragm 122, in response to the drop in fuel pressure differential $P_1-P_2$, will bias the governor valve towards a closed position into engagement with the stem 150 which opens the poppet valve 144. The subsequent increase in fuel pressure $P_x$ in chamber 70 overrides the speed request signal established by control lever 81 such that the control valve 56 moves downward to reduce the effective area of orifice 54 thereby causing an increase in the fuel pressure differential $P_1-P_2$ to the aforementioned predetermined constant value. The poppet valve 144 has an additional function which is brought into play during engine starting. In the absence of a fuel pressure differential across orifice 54, the governor valve is biased to a closed position by spring 132 and the poppet valve 144 held open accordingly which, in turn, permits the fuel pressure $P_x$ to build up as the speed of fuel pump 40 increases during the starting procedure and bias the control valve 56 downwardly into engagement with an adjustable stop 191 threadedly engaged with casing 42. Thus, regardless of the position of the control lever 81 during an engine start, the control valve 56 will be held against stop 191 by fuel pressure $P_x$ and will not begin its timed acceleration cycle until the speed of fuel pump 40 has increased sufficiently to establish the predetermined fuel pressure differential $P_1-P_2$ at which the governor valve begins to open. When the predetermined fuel pressure differential $P_1-P_2$ is attained, the governor valve is caused to open whereupon the poppet valve 144 closes and the control valve 56 begins its timed cycle of operation mentioned heretofore.

The topping governor 154 is employed for isochronous governing of either the turbine 20 or the energy take-off turbine. If it is desired to limit the maximum speed of both the turbine 20 and energy take-off turbine independently of one another, a second topping governor, not shown, similar to governor 154 and responsive to the speed of the energy take-off turbine may be connected in parallel with valve 172 of governor 154 to control pressure $P_x$ in accordance with a preselected maximum speed. At a predetermined speed of turbine 20, the valve 172 is actuated to an open position in response to the speed weights 184 and fuel at pressure $P_1$ is permitted to flow to chamber 70 via passages 168 and 170 causing an increase in pressure $P_x$ and subsequent movement of control valve 56 toward a closed position. The resulting increase in fuel pressure differential $P_1$–$P_2$ causes the governor valve to move in an opening direction thereby reducing fuel flow to the engine. The control valve 56 continues to move until the overspeed error is removed and governor valve stabilized at its null position at which time the control valve 56 will stabilize accordingly at a new position.

Acceleration of the engine may be made to vary linearly or non-linearly with respect to speed to provide optimum acceleration times in accordance with limitations imposed by the compressor surge characteristics and/or temperature limitations of a given engine. To this end, the control valve 56 which moves at constant velocity may be provided, in the one case, with a contour which permits the area of orifice 54 to vary linearly with respect to time. Since the relationship between area of orifice 54 and engine speed is linear and the velocity of valve 56 is constant and thus linear, it follows that speed vs. time will be linear also. If the valve 56 is provided with a non-linear contour, speed vs. time will be non-linear accordingly. FIGURE 4, illustrates this relationship in graphical form.

Engine deceleration is accomplished by actuating control lever 81 toward stop 84 which, in turn, loads spring 100 causing downward movement of valve 82 and a subsequent decrease in the area of orifice 76. The control valve 56 moves in a closing direction in response to the increase in control fuel pressure $P_x$ acting against diaphragm 68. The restriction 74 controls the rate of increase of fuel pressure $P_x$ and thus the rate of movement of valve 56. The follow-up action of valve 82 results in stabilization of the diaphragm 68 and control valve 56 at a position corresponding to the selected position of control lever 81.

It is apparent that details of construction, such as openings in casing 42 for gaining access to component parts enclosed therein, which details are neither shown nor described in the drawings and specifications, may be supplied through the use of ordinary engineering skill.

I claim:

1. Fuel control apparatus for a combustion engine having a combustion chamber and a control lever for controlling the operation of the engine, said fuel control apparatus comprising a source of fuel, a fuel conduit connected to deliver fuel from said source to said combustion chamber, an engine driven fuel pump operative to discharge fuel at a rate proportional to engine speed for pressurizing the fuel in said conduit, variable area valve means in said conduit in series with said fuel pump, control means operatively connected to said control lever and said valve means for controlling said valve means as a function of the position of said control lever, governor means including fuel bypass valve means responsive to variations from a predetermined fuel pressure differential across said variable area valve means operatively connected to said fuel conduit for modifying the fuel flow therethrough, said predetermined fuel pressure differential being attained at a different speed corresponding to the different effective flow area of said variable area valve means, means responsive to a control fluid pressure operatively connected to said variable area valve means for restricting the rate of movement of said variable area valve means in an opening direction during an acceleration of the engine to a selected speed and valve means responsive to engine speed operatively connected to modify said control fluid pressure to restrict movement of said variable area valve means in an opening direction in response to a predetermined limiting engine speed.

2. Fuel control apparatus for a combustion engine having a combustion chamber and a control lever for controlling the operation of the engine, said fuel control apparatus comprising a source of fuel, a fuel conduit connected to deliver fuel under pressure from said source to said combustion chamber, an engine driven fuel pump operative to discharge fuel at a rate proportional to engine speed for pressurizing the fuel in said conduit, a variable area orifice in said conduit for controlling the flow of fuel therethrough, a valve member operatively connected to said orifice for varying the effective flow area thereof, fuel bypass means operatively connected to said fuel conduit and responsive to variations from a predetermined fuel pressure differential across said variable area orifice, said predetermined fuel pressure differential being attained at a different speed corresponding to each different flow area of said orifice, first control servo means operatively connected to said valve member and said control lever for controlling the position of said valve member as a function of control lever position and for controlling the response of said valve member during an acceleration of the engine, said control means being operative to limit the rate of displacement of said valve member and thus the rate of increase of area of said orifice to a predetermined maximum value and second control servo means responsive to a decrease of predetermined magnitude in said predetermined fuel pressure differential operatively connected to said valve member for modifying the response of said valve member to thereby restrict movement of said valve member in an opening direction in the event that the engine fails to accelerate in response to an increase in fuel flow.

3. In a fuel control apparatus as claimed in claim 2 wherein said first servo means includes a conduit defining a fuel flow path, valve means operative as a function of control lever position for controlling flow out of said conduit, a restriction in series with said conduit for controlling fuel flow into said conduit and pressure responsive means responsive to a control fuel pressure generated intermediate said valve means and said restriction operatively connected to said valve member and said second servo means includes a second conduit defining a fuel flow path connected to said conduit intermediate said valve means and said restriction and valve means operatively connected to said second conduit for controlling flow therethrough to modify said control fuel pressure.

4. Fuel control apparatus for a combustion engine having a combustion chamber and a control lever for controlling the operation of the engine, said fuel control apparatus comprising a source of fuel, a fuel conduit connected to deliver fuel under pressure to said combustion chamber, an engine driven fuel pump operative to discharge fuel at a rate proportional to engine speed for pressurizing the fuel in said conduit, a variable area orifice in said conduit for controlling the flow of fuel therethrough to said combustion chamber, a valve member operatively connected to said orifice for varying the effective flow area thereof, fuel bypass means operatively connected to said fuel conduit and responsive to variations from a predetermined fuel pressure differential across said variable area orifice, said predetermined fuel pressure differential being attained at a different speed corresponding to each different flow area of said orifice, servo means for controlling the operation of said valve member including a chamber and a control fuel pressure therein, a pressure responsive member responsive to said control fuel pressure operatively connected to said valve member for controlling the operation thereof, first valve means operative as a function of control lever position for controlling fuel flow out of said chamber, a restriction for controlling fuel flow into said chamber to thereby limit the rate of increase in said control fuel pressure irrespective of the position of said valve means, and second valve means responsive to a decrease of predetermined magnitude in said predetermined fuel pressure differential operatively connected to said chamber for modifying said control fuel pressure to thereby restrict movement of said valve member in an opening direction in the event that the engine fails to accelerate in response to an increase in fuel flow.

References Cited by the Examiner

UNITED STATES PATENTS

| | | | |
|---|---|---|---|
| 870,597 | 11/1907 | Tschopik et al. | 251—38 |
| 2,694,544 | 11/1954 | Hall | 251—38 XR |
| 2,949,957 | 8/1960 | Eastman. | |
| 2,968,346 | 1/1961 | Porter. | |

FOREIGN PATENTS 585,032  1/1947  Great Britain.

FREDERICK KETTERER, *Primary Examiner.*